J. O. SMITH.
VEHICLE TIRE.
APPLICATION FILED SEPT. 10, 1919.

1,390,467.

Patented Sept. 13, 1921.

Inventor:
John O. Smith
By
Thurston Kwis + Hudson
attys

UNITED STATES PATENT OFFICE.

JOHN O. SMITH, OF CLEVELAND, OHIO.

VEHICLE-TIRE.

1,390,467.  Specification of Letters Patent.  Patented Sept. 13, 1921.

Application filed September 10, 1919. Serial No. 322,939.

*To all whom it may concern:*

Be it known that I, JOHN O. SMITH, a citizen of the United States, residing at Cleveland, in the county of Cuyahoga and State of Ohio, have invented a certain new and useful Improvement in Vehicle Tires, of which the following is a full, clear, and exact description.

This invention relates to vehicle tires, and especially to a core designed to be inserted within an ordinary tire casing in much the same manner that the ordinary inflatable inner tube is employed, this core being designed to form a cushioning support for the casing.

The object of the invention is to provide a core which will form an effective cushioning support for the casing, affording the right amount of resiliency, and at the same time having proper supporting action. Still further the invention aims to provide a core or cushioning support having the above mentioned features, and so formed or constructed that it can be inexpensively produced and is at the same time durable.

The core made in accordance with my invention is preferably made from rubber, and at the time that it is formed, has produced therein, certain passageways which give resiliency without disadvantageously affecting the strength of the article and its resistance to collapsing under load. Preferably there are a series of passageways between the periphery and the middle of the core which extend spirally around the core axis, and in addition there is a central passageway spanned by a spiral web.

The invention may be further briefly summarized as consisting in certain novel details of construction which will be described in the specification and set forth in the appended claims.

Figure 1:
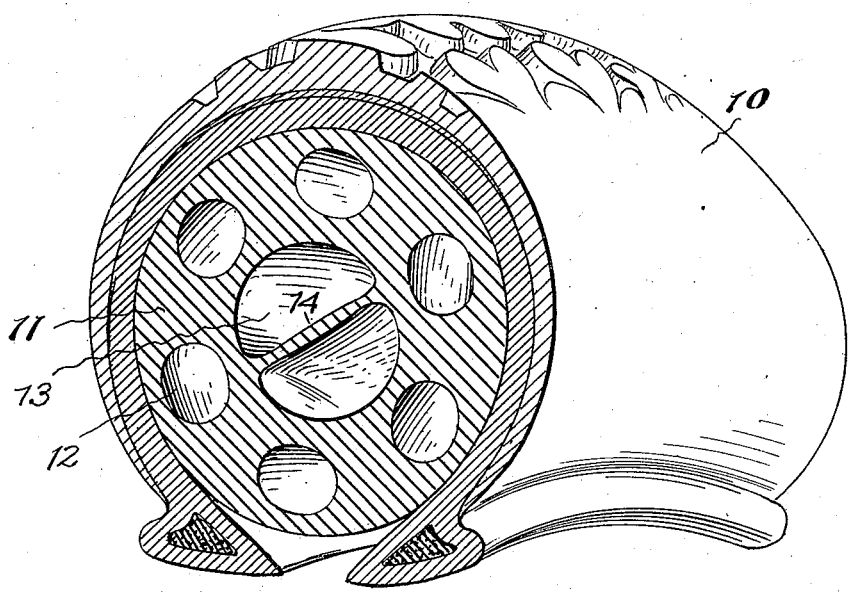
Figure 2:
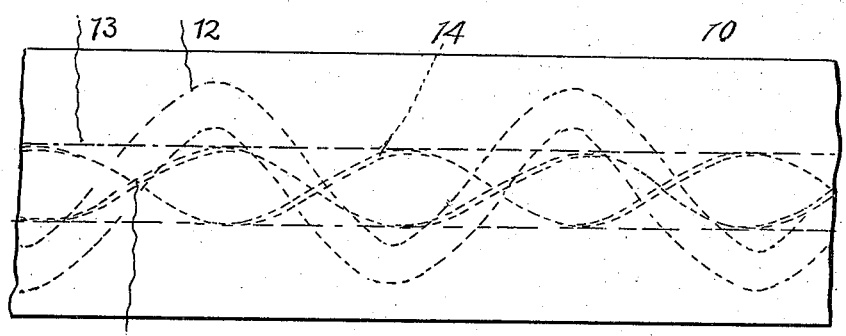

In the accompanying sheet of drawings, Figure 1 is a perspective view of a portion of a tire casing inclosing my improved core or cushioning support therefor; and Fig. 2 is a fragmentary top plan view of the core showing the spiral arrangement of the passageways and web.

In the drawings 10 represents a tire casing which may be of any suitable construction, usually formed of fabric and rubber. The casing incloses a core or inner cushioning support 11 embodying my invention. This core is like the tire casing, of annular shape, and in cross section is circular, or substantially so. It is preferably formed of rubber which when vulcanized has the right degree of resiliency. The manner in which the core is formed will be referred to presently.

It will be observed by referring to Fig. 1 especially, that the core is provided between its periphery and its center with a series of passageways 12, preferably circular in cross section, which passageways are formed by what is akin to a molding process when the core is formed, from plastic material. These passageways extend spirally around the center of the core, as indicated in Fig. 2, where I have indicated for the sake of clearness, only one of these passageways. Centrally of the core there is provided a passageway 13 which is preferably larger than the outer passageways 12. This central passageway 13 is divided at the center by a cross web 14, which is also spirally arranged, as indicated in Fig. 2, the spiral of this web having the same pitch, or twist that the passageways 12 possess. This web is important in affording the right amount of supporting action for a given load, for irrespective of whether the load comes on the tire in line with, or at right angles to the web, it has supporting effect inasmuch as in one instance it is compressed, and in the other instance it is placed under tension.

This core is preferably formed in a so-called tubing machine, the core being formed from rubber or rubber composition in plastic form and squirted through a die or outlet opening, the passageways being formed in the core as the latter is formed in the tubing machine.

As the core is formed, it may be given a spiral twist in emerging from the machine, in which event the passageways 12 and web 14 are given their spiral formation. Or if desired, the core can be extruded without the twisting action, in which event the passageways and web will initially be straight. In this event the core will be twisted after being extruded and before vulcanization. Next the annular extruded member is cut into the proper lengths, and each is then placed in a proper vulcanizing mold and is vulcanized in annular form, the ends of the section being by this process vulcanized together.

Having described my invention, I claim:

1. A core for tires comprising a yieldable annular body formed in one piece and provided with a central passageway extending lengthwise of the body, said passageway bridged by a spiral web integral with the body and extending centrally across said passageway.

2. A core for a vehicle tire comprising a yieldable annular body formed in one piece and provided with longitudinally extending passageways, and a twisted web separating the passageways and located at substantially the center of the body and integral therewith.

3. A core for tires comprising a yieldable annular body formed in one piece and provided with a central passageway extending lengthwise of the body, a spiral web bridging said passageway and integral with the body, and a plurality of passageways between the first-named passageway and the periphery of the core.

4. A core for tires comprising a yieldable annular body formed in one piece and provided with a central passageway extending lengthwise of the body, a spiral web bridging said passageway and integral with the body, and a plurality of passageways between the first-named passageway and the periphery of the core, said last named passageways having a spiral arrangement.

In testimony whereof, I hereunto affix my signature.

JOHN O. SMITH.